United States Patent
Andrade Alfonseca et al.

(10) Patent No.: US 10,862,665 B2
(45) Date of Patent: Dec. 8, 2020

(54) METHOD AND SYSTEM FOR TRANSMITTING DATA RELIABLY

(71) Applicant: THALES, Courbevoie (FR)

(72) Inventors: Damián Andrade Alfonseca, Chatou (FR); Tony Teixeira, Chatou (FR); Stéphane Guguen, Chatou (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/667,455

(22) Filed: Oct. 29, 2019

(65) Prior Publication Data
US 2020/0136794 A1 Apr. 30, 2020

(30) Foreign Application Priority Data
Oct. 31, 2018 (FR) .................... 18 01150

(51) Int. Cl.
*H04L 7/04* (2006.01)
*H04L 7/00* (2006.01)
*H02P 27/06* (2006.01)

(52) U.S. Cl.
CPC ............ *H04L 7/0087* (2013.01); *H04L 7/048* (2013.01); *H02P 27/06* (2013.01)

(58) Field of Classification Search
CPC ..... H04L 7/0025; H04L 7/033; H04L 7/0087; H04L 7/0334; H04L 7/048
(Continued)

(56) References Cited

U.S. PATENT DOCUMENTS 5,450,458 A * 9/1995 Price ................... G06F 1/12
327/145
5,600,662 A 2/1997 Zook
(Continued)

FOREIGN PATENT DOCUMENTS

EP 0 805 574 A1 11/1997
WO 2014/116931 A1 7/2014

*Primary Examiner* — Emmanuel Bayard
(74) *Attorney, Agent, or Firm* — BakerHostetler

(57) ABSTRACT

A method and device for transmitting data reliably to at least one item of equipment is provided, wherein: from its initial clock $H_1$, an item of equipment generates at least one first clock $H_{1U}$ from a rising edge of the initial clock $H_1$ with a frequency $F_{1U}$ and a second clock $H_{1D}$ from a falling edge of the initial clock $H_1$, with a frequency $F_{1D}$, the item of equipment: reads the received data using at least one first rising edge of $H_{1U}$ and one falling edge consecutive to the first rising edge of $H_{1U}$, then reads the received data using a first rising edge of $H_{1D}$ and a falling edge consecutive to the first rising edge of $H_{1D}$, the four clock edges used being consecutive by $2F_1$, decodes at least the four messages using an error-correcting code, when at least one decoded message is correct, it uses the information contained in this message to drive a device linked to said item of equipment.

6 Claims, 2 Drawing Sheets

(58) Field of Classification Search
USPC .................................. 375/354–356
See application file for complete search history.

(56) References Cited

U.S. PATENT DOCUMENTS

| | | | | |
|---|---|---|---|---|
| 5,687,193 | A | 11/1997 | Abou Hassan | |
| 5,835,753 | A * | 11/1998 | Witt | G06F 7/00 713/600 |
| 5,867,533 | A * | 2/1999 | Fleek | H04L 27/2332 370/445 |
| 6,226,223 | B1 * | 5/2001 | Shirahama | G11C 7/22 365/149 |
| 8,371,669 | B1 * | 2/2013 | Mealy | B41J 19/202 347/14 |
| 2005/0081129 | A1 | 4/2005 | Shah et al. | |
| 2005/0088906 | A1 * | 4/2005 | Kim | G11C 7/08 365/233.1 |
| 2005/0122153 | A1 * | 6/2005 | Lin | H03L 7/10 327/291 |
| 2008/0288804 | A1 * | 11/2008 | Gorti | G01R 31/31727 713/400 |
| 2009/0049455 | A1 * | 2/2009 | Ito | G06F 1/3228 719/315 |
| 2009/0198881 | A1 * | 8/2009 | Toda | G06F 11/1048 711/108 |
| 2011/0096883 | A1 * | 4/2011 | Bae | H04L 7/042 375/359 |
| 2012/0142300 | A1 * | 6/2012 | Herzinger | H04B 1/26 455/293 |
| 2013/0197920 | A1 * | 8/2013 | Lesso | H04L 25/49 704/500 |
| 2017/0269991 | A1 * | 9/2017 | Bazarsky | G06F 11/1012 |

* cited by examiner

METHOD AND SYSTEM FOR TRANSMITTING DATA RELIABLY

CROSS-REFERENCE TO RELATED APPLICATIONS

This application claims priority to foreign French patent application No. FR 1801150, filed on Oct. 31, 2018, the disclosure of which is incorporated by reference in its entirety.

FIELD OF THE INVENTION

The invention relates to a method for transmitting data reliably, ensuring that on reception the data correspond to the transmitted data. It applies in particular to the transmission of data in a system comprising a plurality of synchronous items of equipment, the clocks of which may exhibit drift. The method may be used in systems that must simultaneously deliver power to a rotating machine.

BACKGROUND

In the case of transmission of simultaneous information, reliability of data transmission is essential to the correct operation of the system.

When the transmission of data simultaneously between a plurality of items of equipment is necessary to ensure this reliability, it is known practice to use a communication bus to transmit the data and a bus to transmit a clock in order to synchronize the transmission of the data. FIG. 1A schematically shows this type of architecture with a transmission line for the data D and the use of a dedicated clock CLK to synchronize the transmission. This requires installation of additional wiring.

In the case of items of equipment that are not synchronized by a clock common to the various items of equipment (no distributed clock), the items of equipment must have the same operating frequency and the tolerance of the clocks of each item of equipment must be low, in order to prevent too great a drift in the time of reception of the data by each of the items of equipment. In this case, as is schematically shown in FIG. 1B, an offset (phase shift) between the data-transmitting clock $CLK_{TX}$ and the data-receiving clock $CLK_{RX}$ may appear. In general, the rising or falling edge of the clock of the receiving item of equipment is used to ensure that the data is read out correctly.

Furthermore, during the transmission of data, interference on the transmission line may cause a false bit to be read out, this possibly resulting in poor detection of a start bit for the read-out. In this case, the read-out of the messages will be erroneous. If the system comprises a correcting means of CRC type, the message will quite simply be rejected. The system may then repeat the transmission of the message until a satisfactory result is obtained. This method has the drawback of decreasing useful bandwidth.

Document EP0805574 discloses a system for generating a clock by selecting a single clock among eight.

SUMMARY OF THE INVENTION

The idea of the present invention is based on a new approach to the read-out of data that exploits in particular chosen and consecutive clock edges of two clocks generated from an initial first clock operating at a frequency value at least equal to two times the frequency of transmission of the data.

The invention relates to a method for transmitting data reliably to at least one item of equipment provided with an initial clock $H_1$ in a system comprising at least one message-transmitting item of equipment working with a first clock $H_0$, characterized in that it comprises at least the following steps:

From its initial clock $H_1$, at an initial frequency $F_1$, an item of equipment generates at least one first clock $H_{1U}$ from a rising edge of the initial clock $H_1$ with a frequency $F_{1U}$ and a second clock $H_{1D}$ from a falling edge of the initial clock $H_1$, with a frequency $F_{1D}$, The item of equipment then executes the following steps:

Reading the received data using the first clock $H_{1U}$ at a frequency $F_{1U}$ and the second clock $H_{1D}$ at a frequency $F_{1D}$ and using at least one first rising edge of the first clock $H_{1U}$ followed by a falling edge consecutive to the first rising edge of the generated first clock $H_{1U}$, then a first rising edge of the second clock $H_{1D}$ followed by a falling edge consecutive to the first rising edge of the generated second clock $H_{1D}$, the four clock edges used being consecutive.

Decoding at least the four messages using an error-correcting code,

When at least one message is decoded correctly, using the information contained in this message to drive a device linked to said one or more items of equipment.

The driving operation may be used to regulate the operation of a device.

The data are communicated, for example, using a communication protocol implementing a correction of CRC error-correcting-code type.

The values of the frequencies are, for example, defined in the following way:

$$F_{1U} = F_{1D} = \frac{F_1}{2} = F_0 \pm \frac{F_0}{N_0}$$

where $F_0$ is the initial frequency corresponding to the transmitting item of equipment and $N_0$ is the number of bits of the message.

The method according to the invention is employed with inverters synchronously delivering power to a rotating machine.

The invention also relates to a system for transmitting data reliably to at least one item of equipment configured to drive a device, the system comprising a device having a clock $H_0$ operating at a frequency $F_0$ characterized in that an item of equipment comprises at least the following elements:

A clock-generating module configured to generate, from the initial clock $H_1$ of the item of equipment, at an initial frequency $F_1$, at least one first clock $H_{1U}$ from a rising edge of the initial clock $H_1$, with a frequency $F_{1U}$, and one second clock $H_{1D}$ from a falling edge of the initial clock $H_1$, with a frequency $F_{1D}$, A data-processing module configured to:

Read the received data using at least a first rising edge of the first clock $H_{1U}$ and a falling edge consecutive to the first rising edge of the generated first clock $H_{1U}$, then read the received data using a first rising edge of the second clock $H_{1D}$ and a falling edge consecutive to the first rising edge of the generated second clock $H_{1D}$, the four clock edges used being consecutive by $2F_1$, and decode at least the four messages using an error-correcting code, If the verification of the message with the CRC error-correcting code is correct, use the information contained in the message to generate a drive signal for a device linked to said one or more items of equipment.

The data-transmitting device is configured, for example, to use a communication protocol having a CRC error corrector.

The data-transmitting device is linked to a plurality of inverters configured to generate power, synchronously, and to deliver said power to a rotating machine.

BRIEF DESCRIPTION OF THE DRAWINGS

Other features and advantages of the present invention will become more clearly apparent on reading the description of example embodiments, which are given by way of completely nonlimiting illustration, with reference to the figures, which show.

DETAILED DESCRIPTION

Figure 1A:
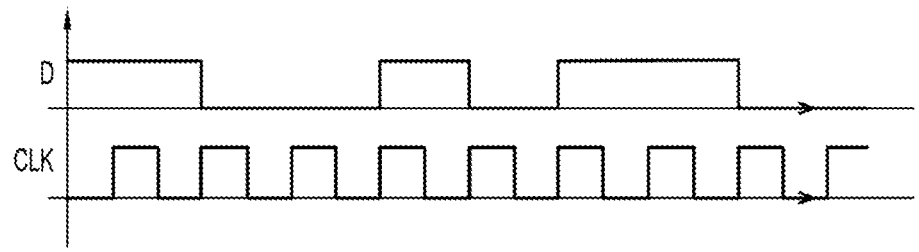
FIG. 1A, an illustration of the use of a clock dedicated to the read-out of data, and FIG. 1B, the use of two clocks according to the prior art, FIG. 2, an example of implementation of the invention, FIG. 3, a schematic illustrating the generation of the two clocks according to the method of the invention, and FIG. 4, an example of a timing diagram for the read-out of data using the method according to the invention.
Figure 1B:
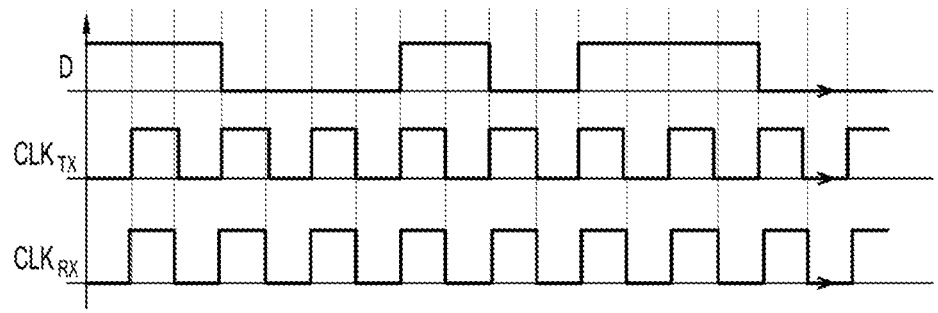
Figure 2:
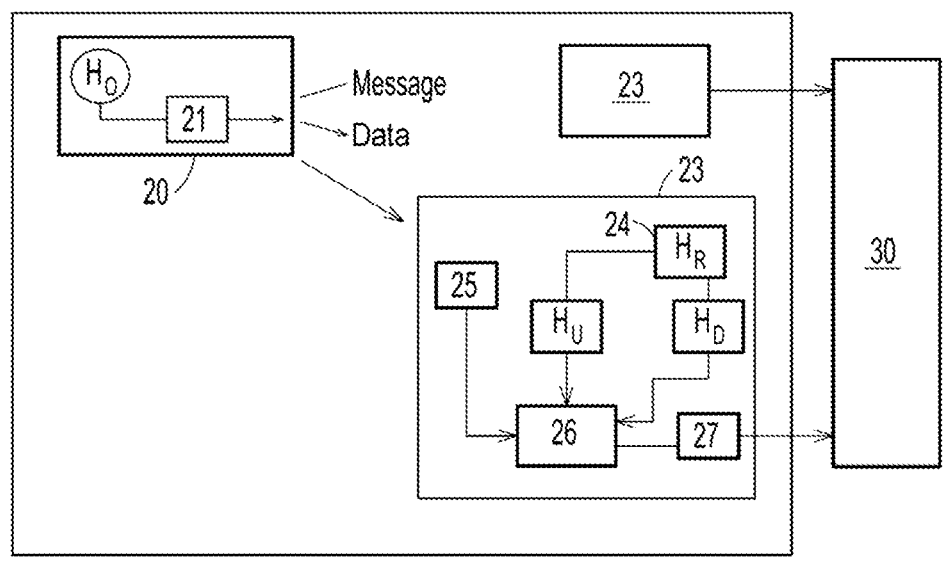

In order to allow the method according to the invention to be clearly understood, the following example is given by way of completely nonlimiting illustration with respect to a system comprising a plurality of inverters that are configured to deliver power (energy) to a rotating machine, such as shown in FIG. 2. These inverters must be able to deliver power simultaneously, in order to prevent returns of power via the wires, which could adversely affect operation, and instead to obtain a summation of the power. In FIG. 2, for the sake of simplicity, only the detail of the link of one item of inverting equipment has been shown.

FIG. 2 comprises a data-transmitting device 20 that transmits data D, comprising at least one clock $H_0$ operating at a frequency $F_0$ and one data-transmitting module 21.

The data D contained in a message M are transmitted by means of a communication protocol, which is known to those skilled in the art and will not be detailed here, to an item of equipment 23 such as an inverter configured, for example, to generate power for a rotating machine 30. The item of equipment configured to generate power comprises a clock $H_R$, a module 24 for generating two clocks $H_{1D}$, $H_{1U}$, from an initial first clock $H_1$, a message-receiving module 25, and a data-processing module 26, such as a processor, that will process the received data at the rate of the two clocks, using the clock edges, according to the steps of the method according to the invention described below, in order to determine the one or more correctly read or decoded data. These data will then be used by a power-generating module 27 to deliver power, on reception of a control signal, to the rotating machine 30.

Figure 3:
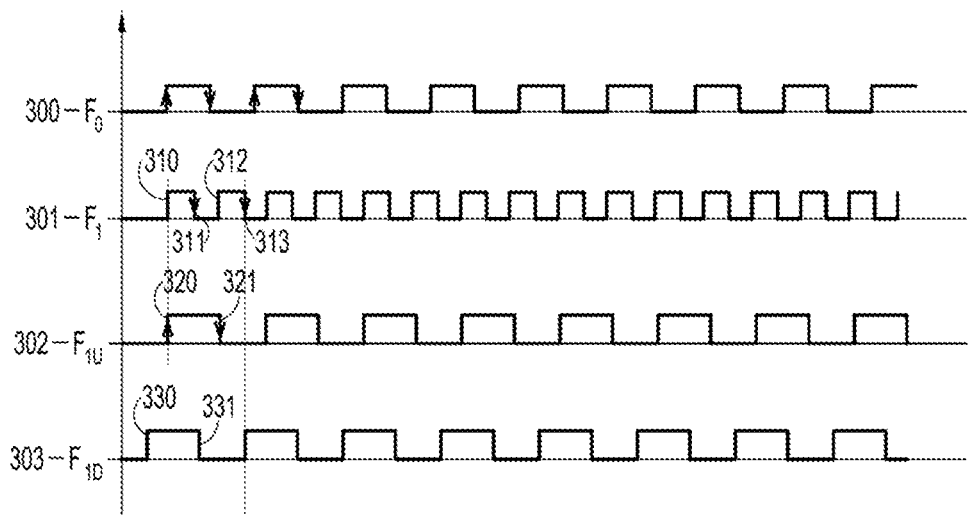

FIG. 3 illustrates an example, for generation of the two clocks obtained from the initial clock, of operation of an item of equipment, said clocks being used for the read-out of the data received by the item of equipment.

300 Clock of the transmitting item of equipment at a frequency $F_0$
301 Clock of the receiving item of equipment at an initial frequency $F_1$
302 Clock generated on the rising edges at a frequency $F_{1U}$
303 Clock generated on the falling edges at a frequency $F_{1D}$ The clock-generating module considers the initial clock $H_1$ of the receiving module of the item of equipment and generates:

a first clock $H_{1U}$ by considering a first rising edge 310 of the initial clock $H_1$ in order to generate a first rising edge 320 of the first clock $H_{1U}$, a second rising edge 312 of the initial clock $H_1$ in order to generate a first falling edge 321 with a frequency $F_{1U}$, a second clock $H_{1D}$ by considering a first falling edge 311 of the initial clock $H_1$ in order to generate a first rising edge 330 of the second clock $H_{1D}$, a second falling edge 313 of the initial clock $H_1$ in order to generate a first falling edge 331 of the second clock $H_{1D}$ with a frequency $F_{1D}$.

Figure 4:
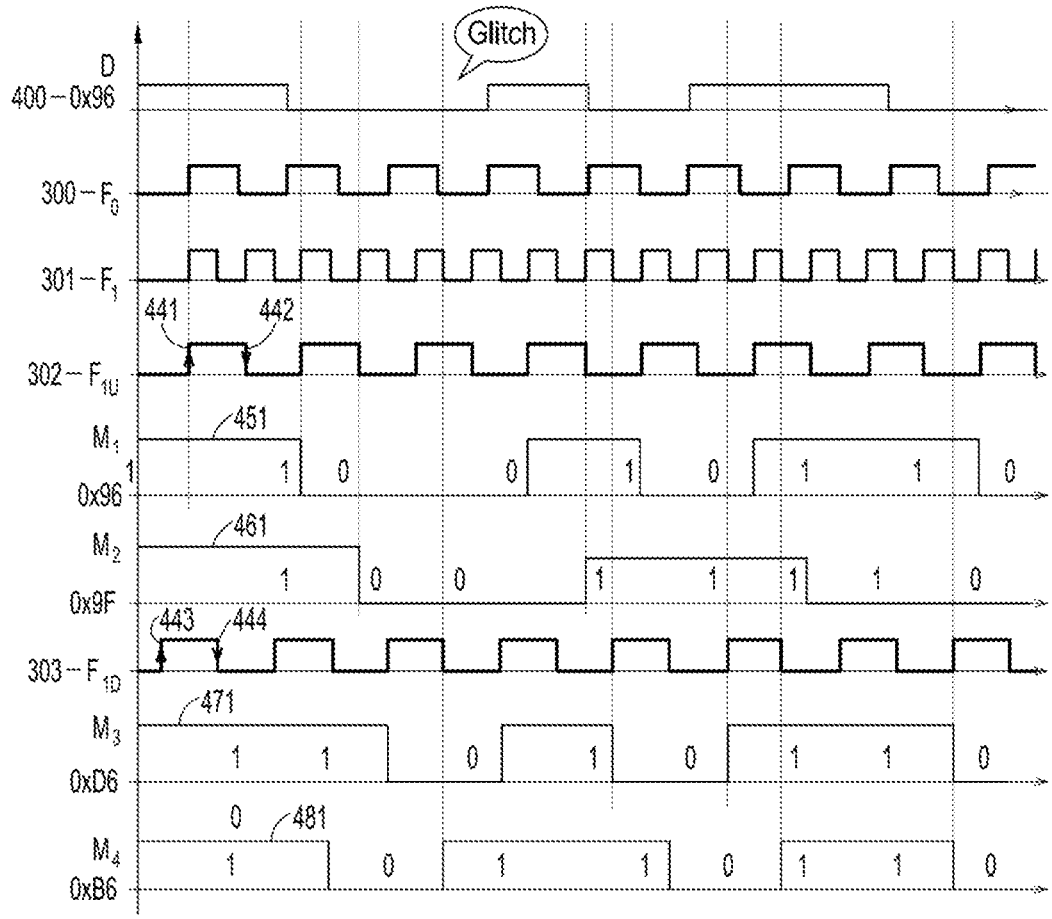

FIG. 4 illustrates the sequencing of the read-out of the data based on the two clocks $H_{1U}$ and $H_{1U}$.

The transmitting item of equipment of the data-transmitting device sends a message containing data D, 400, of $N_0$ bits in size at a frequency $F_0$, 300. The transmission may be carried out using a communication protocol known to those skilled in the art, implementing a method for verifying the transmission of data of CRC (cyclic redundancy check) type, for example.

The initial clock $H_1$ of the receiving module of the item of equipment operates at a frequency $F_1$, 301 and allows a first clock $H_{1U}$, 302 and a second clock $H_{1D}$, 303 to be generated, as was explained above with reference to FIG. 3.

The frequency $F_1$ is equal to $2F_0$ with an error $$< 2\frac{F_0}{N_0}.$$

The data will be read out using the two generated clocks of frequency $F_{1U}$ and $F_{1D}$, respectively, using two consecutive edges of the first clock $H_{1u}$ and two consecutive edges of the second clock $FH_{1D}$ (four consecutive edges). Thus the read-out is performed on a rising edge of $H_{1U}$, followed by a falling edge of $H_{1U}$, at a frequency $F_{1U}$, followed by a rising edge of $H_{1D}$, followed by a falling edge of $H_{1D}$ at a frequency $F_{1D}$ with the relationships:

$$F_{1U} = F_{1D} = \frac{F_1}{2} = F_0 \pm \frac{F_0}{N_0}$$

The frequency $F_0$ of the transmitter and the frequency $F_0 +/- \varepsilon$ of the receiver are not strictly identical and the difference between the two items of equipment may be $$\varepsilon \le \frac{F_0}{N_0}.$$

In addition, even it the phase of the two items of equipment is different, data may be transmitted safely and certainly between the two items of equipment if the two items of equipment have the same operating frequency $F_0$.

In the example given by way of illustration, the frequency is 1 Hz and therefore the period is 1 s. The number of bits to be transmitted is eight. Therefore the maximum tolerated offset for the clocks is ⅛=0.125 s. The required tolerance will depend on the size of the message.

The receiver reads the message at four successive edges:
On the rising edge of $H_{1U}$, 441, M1 received data, 451,
On the falling edge of $H_{1U}$, 442, M2 received data 461,
On the rising edge of $H_{1D}$, 443, M3 received data 471,
On the falling edge of $H_{1D}$, 444, M4 received data 481.

The four read-outs M1, M2, M3 and M4 are transmitted to the data-processing module, which will use an error-correcting method, for example a CRC code, in order to determine the one or more correct messages.

When at least one single of the four messages is correct, then the processing module deduces therefrom that the transmitted original message is perturbed. In this case, it does not take into account the decoded message and will restart a cycle of reading and decoding the message until a correct decode is obtained.

In the case where at least one message is decoded correctly (decoded message correct and corresponding to a reliable message) after application of a CRC error-correcting code, then the processing module concludes that the message is reliable, and that the data contained are also reliable and may be used to drive a device.

In the case of application to delivery of power to a rotating machine, synchronization of the transmission of the control signal for the items of equipment delivering power to the rotating machine is thus ensured and any returns of current via linking lines between the various items of equipment, which could be detrimental to the correct operation of the machine, or even damage it, are thus avoided.

The method according to the invention advantageously allows the message to be read out while detecting any possible errors, without using a dedicated clock line. The tolerance between the clocks of each item of equipment of the system has no impact on the result of the read-out. The method avoids message retransmissions that decrease useful bandwidth.

The invention claimed is:

1. A method for transmitting data reliably to at least one item of equipment provided with an initial clock $H_1$ in a system comprising at least one message-transmitting device working with a first clock $H_0$, wherein it comprises at least the following steps:

from its initial clock $H_1$, at an initial frequency $F_1$, an item of equipment generates at least one first clock $H_{1U}$ from a rising edge of the initial clock $H_1$ with a frequency $F_{1U}$ and a second clock $H_{1D}$ from a falling edge of the initial clock $H_1$, with a frequency $F_{1D}$, values of the frequencies being defined as:

$$F_{1U} = F_{1D} = \frac{F_1}{2} = F_0 \pm \frac{F_0}{N_0}$$

where $F_0$ is the initial frequency corresponding to the transmitting item of equipment and $N_0$ is the number of bits of the message, the item of equipment then executes the following steps:

reading the received data using the first clock $H_{1U}$ at a frequency $F_{1U}$ and the second clock $H_{1D}$ at a frequency $F_{1D}$ and using at least one first rising edge of the first clock $H_{1U}$ followed by a falling edge of the first clock $H_{1U}$ consecutive to the first rising edge of the generated first clock $H_{1U}$, then a first rising edge of the second clock $H_{1D}$ followed by a falling edge of the second clock $H_{1D}$ consecutive to the first rising edge of the generated second clock $H_{1D}$, the four clock edges used being consecutive, decoding at least the four messages using an error-correcting code, when at least one message is decoded correctly, using information contained in this message to drive a device linked to said one or more items of equipment.

2. The method according to claim 1, wherein the data are communicated using a communication protocol implementing a correction of CRC error-correcting-code type.

3. The method according to claim 1, wherein the items of equipment are inverters delivering power to a rotating machine.

4. A system for transmitting data reliably to at least one item of equipment configured to drive a device, the system comprising a device having a clock $H_0$ operating at a frequency $F_0$, wherein an item of equipment is configured to:

generate, from the initial clock $H_1$ of the item of equipment, at an initial frequency $F_1$, at least one first clock $H_{1U}$ from a rising edge of the initial clock $H_1$, with a frequency $F_{1U}$, and one second clock $H_{1D}$ from a falling edge of the initial clock $H_1$, with a frequency $F_{1D}$, values of the frequencies being defined as:

$$F_{1U} = F_{1D} = \frac{F_1}{2} = F_0 \pm \frac{F_0}{N_0}$$

where $F_0$ is the initial frequency corresponding to the transmitting item of equipment and $N_0$ is the number of bits of the message, read the received data using at least a first rising edge of the first clock $H_{1U}$ and a falling edge consecutive to the first rising edge of the generated first clock $H_{1U}$, then read the received data using a first rising edge of the second clock $H_{1D}$ and a falling edge consecutive to the first rising edge of the generated second clock $H_{1D}$, the four clock edges used being consecutive by $2F_1$, and decode at least the four messages using an error-correcting code, if the verification of at least one message with the error-correcting code is correct, use information contained in the message to generate a drive signal for a device linked to said one or more items of equipment.

5. The system according to claim 4, wherein the data-transmitting device is configured to use a communication protocol having a CRC error corrector.

6. The system according to claim 4, wherein the data-transmitting device is linked to a plurality of inverters configured to generate power and to deliver said power to a rotating machine.

* * * * *